(12) United States Patent
Funke et al.

(10) Patent No.: US 8,931,751 B2
(45) Date of Patent: Jan. 13, 2015

(54) MOLDING TOOL FOR ORIGINAL SHAPING OR RESHAPING OF COMPONENTS COMPOSED OF MATERIALS THAT CAN BE THERMALLY INFLUENCED

(75) Inventors: Herbert Funke, Rheda-Wiedenbrueck (DE); Jens Brandes, Bremen (DE); Jan Meyer, Bremen (DE)

(73) Assignee: Fibertemp GmbH & Co.KG, Bremen (DE)

( * ) Notice: Subject to any disclaimer, the term of this patent is extended or adjusted under 35 U.S.C. 154(b) by 779 days.

(21) Appl. No.: 12/448,024

(22) PCT Filed: Dec. 6, 2007

(86) PCT No.: PCT/DE2007/002219
§ 371 (c)(1),
(2), (4) Date: Jun. 4, 2009

(87) PCT Pub. No.: WO2008/067809
PCT Pub. Date: Jun. 12, 2008

(65) Prior Publication Data
US 2010/0062099 A1    Mar. 11, 2010

(30) Foreign Application Priority Data
Dec. 7, 2006    (DE) .................... 10 2006 058 198

(51) Int. Cl.
*B29C 70/08* (2006.01)
*B29C 33/02* (2006.01)
(Continued)

(52) U.S. Cl.
CPC ................. *B29C 33/02* (2013.01); *B29C 70/08* (2013.01); *B21D 37/16* (2013.01); *H05B 3/36* (2013.01);
(Continued)

(58) Field of Classification Search
CPC ........ B29C 33/02; B29C 70/08; B29C 33/40; B29C 70/228; B29C 70/882; B21D 37/16; B22D 27/04; H05B 3/18; H05B 3/36; D04H 1/4242; B29K 2707/04; B29K 2709/08; B29K 2995/0003

USPC .......... 425/384, 403, 407, 470, 547, DIG. 13, 425/174.8 R, 174.8 E; 249/78, 79, 114.1, 249/115, 134, 135, 80; 219/221, 240, 264, 219/266, 268, 539, 542, 544–546, 550, 552, 219/529, 548, 549, 603, 605, 633; 338/255, 338/259–261, 275, 314; 156/379.7; 264/486, 487, 496
See application file for complete search history.

(56) References Cited

U.S. PATENT DOCUMENTS 3,387,333 A * 6/1968 Irvine et al. .................... 425/404
3,968,296 A * 7/1976 Nopper et al. .................... 442/8
(Continued)

FOREIGN PATENT DOCUMENTS

DE    689 19 929 T2    5/1995
DE    199 42 364 A1    3/2001
(Continued)

OTHER PUBLICATIONS

Ceramic material properties, p. 1, date is not available.*
(Continued)

*Primary Examiner* — Dimple Bodawala
(74) *Attorney, Agent, or Firm* — Myers Bigel Sibley & Sajovec, P.A.

(57) ABSTRACT

The invention relates to a molding tool for the production of components composed of fiber composite materials, in which the molding tool has a fiber composite structure and an electrical resistance heating element, whereby carbon fibers or carbon filaments are embedded into the fiber composite structure of the molding tool in a plastic matrix, close to the shaping surface of the molding tool. Such a molding tool is further developed in that the carbon fibers or carbon filaments in the plastic matrix, close to the shaping surface, essentially determine the mechanical strength of the molding tool, and that the electrical resistance heating element is interconnected in such a manner that at least individual sections of the electrical resistance heating element form an electrical parallel circuit with one another.

23 Claims, 3 Drawing Sheets

(51) Int. Cl.
| | |
|---|---|
| *B21D 37/16* | (2006.01) |
| *H05B 3/18* | (2006.01) |
| *H05B 3/36* | (2006.01) |
| *B29C 33/40* | (2006.01) |
| *B29C 70/22* | (2006.01) |
| *B29C 70/88* | (2006.01) |
| *D04H 1/4242* | (2012.01) |
| *B29K 707/04* | (2006.01) |
| *B29K 709/08* | (2006.01) |

(52) U.S. Cl.
CPC ............ *H05B 3/18* (2013.01); *D04H 1/4242* (2013.01); *B29C 33/40* (2013.01); *B29C 70/228* (2013.01); *B29C 70/882* (2013.01); *B29K 2707/04* (2013.01); *B29K 2709/08* (2013.01); *B29K 2995/0003* (2013.01)
USPC ............ 249/80; 249/78; 249/114.1; 249/115; 249/134

(56) References Cited

U.S. PATENT DOCUMENTS

| | | | | |
|---|---|---|---|---|
| 4,385,957 | A * | 5/1983 | Wackerle et al. | 156/273.9 |
| 4,700,054 | A * | 10/1987 | Triplett et al. | 219/545 |
| 4,729,860 | A * | 3/1988 | Leach | 264/103 |
| 4,954,209 | A * | 9/1990 | Baron | 156/583.1 |
| 5,064,597 | A * | 11/1991 | Kim | 264/219 |
| 5,082,436 | A * | 1/1992 | Choi et al. | 425/174.8 R |
| 5,250,228 | A * | 10/1993 | Baigrie et al. | 252/511 |
| 5,413,744 | A * | 5/1995 | Bruckner et al. | 264/431 |
| 5,483,043 | A * | 1/1996 | Sturman et al. | 219/647 |
| 5,632,925 | A * | 5/1997 | Moulton et al. | 249/115 |
| 5,989,008 | A * | 11/1999 | Wytkin | 425/432 |
| 6,004,418 | A * | 12/1999 | Ginman et al. | 156/212 |
| 6,018,141 | A * | 1/2000 | Miller et al. | 219/221 |
| 6,146,576 | A * | 11/2000 | Blackmore | 264/404 |
| 6,429,157 | B1 * | 8/2002 | Kishi et al. | 442/227 |
| 6,483,087 | B2 * | 11/2002 | Gardner et al. | 219/545 |
| 6,516,530 | B1 * | 2/2003 | Sargent | 33/562 |
| 6,566,635 | B1 * | 5/2003 | Matsen et al. | 219/633 |
| 7,066,000 | B2 * | 6/2006 | Hammar | 72/342.92 |
| 7,679,036 | B2 * | 3/2010 | Feigenblum et al. | 219/635 |
| 7,785,509 | B2 * | 8/2010 | Perera et al. | 264/136 |
| 7,972,129 | B2 * | 7/2011 | O'Donoghue | 425/388 |
| 2003/0168164 | A1 * | 9/2003 | Blackmore et al. | 156/308.2 |
| 2003/0173715 | A1 * | 9/2003 | Grutta et al. | 264/450 |
| 2003/0190452 | A1 * | 10/2003 | Lucas et al. | 428/116 |
| 2005/0023727 | A1 * | 2/2005 | Sampson | 264/257 |
| 2005/0196481 | A1 * | 9/2005 | Spradling et al. | 425/174 |
| 2007/0108655 | A1 * | 5/2007 | Aramburu et al. | 264/255 |
| 2008/0063875 | A1 * | 3/2008 | Robinson et al. | 428/426 |
| 2008/0087793 | A1 * | 4/2008 | Shepheard | 249/80 |
| 2008/0303194 | A1 * | 12/2008 | Anbarasu et al. | 264/403 |
| 2009/0233092 | A1 * | 9/2009 | Hara et al. | 428/339 |
| 2010/0140448 | A1 * | 6/2010 | Koerwien | 249/78 |
| 2010/0140975 | A1 * | 6/2010 | Cho et al. | 296/178 |
| 2010/0233452 | A1 * | 9/2010 | Hoesch-Vial | 428/213 |
| 2013/0164133 | A1 * | 6/2013 | Grove-Nielsen | 416/95 |

FOREIGN PATENT DOCUMENTS

| | | | |
|---|---|---|---|
| DE | 101 24 721 A1 | 11/2002 | |
| DE | 10 2004 042 422 | 3/2006 | |
| EP | 0 038 922 A2 | 11/1981 | |
| EP | 0 164 259 | 12/1985 | |
| EP | 0 218 038 | 4/1987 | |
| EP | 0 351 154 B1 | 1/1990 | |
| FR | 2 691 400 | 11/1993 | |
| GB | 2180495 A * | 9/1985 | ............. B29C 51/00 |
| WO | WO 00/54949 | 9/2000 | |

OTHER PUBLICATIONS

Table of ceramic material properties, published by Coorstek, p. 1, date is not available.*
Translation of DE 10 2004 042 422 A1 received from EPO transaltion cite, pp. 1-3, date is not available.*
English Translation of the International Preliminary Report on Patentability.
Brochure: "Heizsystem für Kunstharz-Formen" (Heating system for synthetic resin molds), prior to 2001. (Spec, p. 8).
International Search Report.
Dissertation of J. Brandes and I. Gebauer working for R&G Faserverbundwerkstoffe GmbH, "Enwicklung beheizbarer Leichtgewichtsformen", Universitaet—GH Paderborn, 1996.
E. Wintermantel et al., p. 248 of "Medizintechnik mit biokompatiblen Werkstoffen and Verfahren", 2002, Springer-Verlag Berlin Heidelberg New York, printed in Germany.
Konrad Bergmeister, p. 51 of "Kohlenstofffasern im Konstruktiven Ingenieurbau", 2003, Ernst & Sohn, printed in Germany, ISBN 3-433-02847-8.

* cited by examiner

MOLDING TOOL FOR ORIGINAL SHAPING OR RESHAPING OF COMPONENTS COMPOSED OF MATERIALS THAT CAN BE THERMALLY INFLUENCED

CROSS REFERENCE TO RELATED APPLICATIONS

This application is the National Stage of PCT/DE2007/002219 filed on Dec. 6, 2007, which claims priority under 35 U.S.C. §119 of German Application No. 10 2006 058 198.9 filed on Dec. 7, 2006. The international application under PCT article 21(2) was not published in English.

The invention relates to a molding tool for original shaping or reshaping of components composed of materials that can be thermally influenced, in accordance with the preamble of claim 1.

Fiber-reinforced plastics are increasingly gaining importance in many areas of vehicle technology. Typical examples of plastic constructions reinforced with long fibers are attached parts on cars (for example spoilers), large-area body elements in the case of rail vehicles and utility vehicles, boat hulls, from small kayaks to large yachts, as well as rotors of wind turbines. In aeronautics and car racing (for example in Formula 1), structures now consist for the most part of plastics reinforced with long fibers, because of their excellent weight-specific properties. A very significant advantage of the fiber-reinforced plastics is not only their good weight-related mechanical properties, but also the possibility of being able to produce components in almost any desired size, even in small to medium piece numbers, at comparatively low investment costs.

For this reason, fiber-reinforced plastics have been used, up to this time, preferably in small to medium-size series, and in prototype construction. In particular, plastic parts made of fiber composites reinforced with long fibers, which are preferably produced using duroplastic plastics, require long dwell times in the mold because of the curing time of the plastic, and this results in long cycle times and greatly restricts the ability to produce such components in large-scale mass production.

In order to increase the economic efficiency here, corresponding molds, which also consist of fiber-reinforced plastic, in most cases, particularly in the case of large components, are heated. Targeted temperature management in the component production supports saturation of the fibers, because it lowers the resin viscosity, and significantly accelerates curing of the duroplastic plastics, in particular. Furthermore, the degree of cross-linking of the duroplastics is increased by means of adding temperature, so that so-called tempering is absolutely necessary for high-quality components. This tempering is actually previously described for components that are used in aeronautics, depending on the plastic system used.

Heating molds for the production of work pieces is usual in mold construction, and generally takes place, in the case of metallic molds, as fluid heating or electrical resistance heating. In both cases, the great heat conductivity of the metal mold guarantees a uniform, homogeneous temperature distribution of the molding tool.

However, metallic molds are very expensive. For very large components, metal molds are not economically efficient, particularly if these components are only produced in very low numbers of pieces. For this reason, corresponding fiber composite components are frequently produced in plastic molds, as already stated above, which are very much more cost-advantageous than metallic molds, and still guarantee a sufficient number of unmolding processes. At least 100 unmolding processes per mold are usual in plastic molds, and if the mold is structured appropriately, more than 1000 unmolding processes per mold can be achieved. Metallic molds, in comparison, allow many times the number of unmolding processes without any reworking of the mold, but also require a correspondingly greater investment expense.

Heating of corresponding plastic molds is problematical, because the plastic has significantly less heat conductivity than metals, and furthermore is very subject to distortion, particularly in the case of non-uniform heat distribution of the mold. This is problematical for components having great precision requirements with regard to mold fidelity and dimensional accuracy. For this reason, plastic molds that are heated with water were not able to become common for broad use. In general, a separate tempering chamber is necessary for operations that process plastics and produce corresponding components. After production, molds are brought into the tempering chamber, with the components, for curing and tempering.

It is particularly known in the case of metal molds that molds can be heated by way of fluids. In this connection, the molds are equipped with a fluid channel system that is structured in different ways, through which correspondingly tempered fluids are transported. In this connection, the channel system heats the mold at a certain distance from the surface that is actually supposed to be heated. In the case of mold materials having good heat conductivity, however, this is not problematical. In the case of mold materials having low heat conductivity, such as plastic molds, for example, the low heat conductivity leads to a non-homogeneous temperature distribution. For this reason, plastic molds that are to be heated are provided with heat-conductive fillers, in part, such as aluminum powder, for example, in order to improve the heat conductivity.

Nevertheless, relatively poor dimensional accuracy, distortion of the molds, non-homogeneous temperature distribution, and the relatively high production cost of fluid-heated plastic molds are problematical. Because of the great masses of such molds, a relatively great expenditure of energy is required for every heating process.

Electrical resistance heating represents an alternative. In this connection, in the case of metallic molds, heating cartridges are frequently used. Because of the great heat conductivity of the metallic mold material, a sufficiently homogeneous temperature distribution is generally achieved.

In the case of plastic molds, because of the relatively poor temperature conductivity, a heating system that has a planar effect, close to the surface to be heated, is advantageous. This can be implemented by means of corresponding woven heating textiles, which can be embedded into the plastic close to the mold surface. Woven heating textiles specially developed for this purpose consist in part of resistor wires or also of conductive fiber material, such as carbon fibers, for example. The resistor wires or resistor fibers, respectively, act as ohmic resistance elements in this connection. In fact, this type of heating system is a heating system that has a line-shaped effect, in which a heating heat is generated along each individual resistor wire or each resistor fiber, and conducted away from the surrounding mold mass. However, in the case of a very fine and dense distribution of the resistor wires or resistor fibers, respectively, this heating system acts in approximately planar manner, considered macroscopically.

In the case of these resistance heating systems, the heating elements that act as wires or fibers are embedded in electrically insulating layers. These electrically insulating layers can consist, for example, of epoxy resin and glass fibers in the case of glass-fiber-reinforced molds, which are known to have very good electrical insulation, but also relatively poor heat conductivity. In this connection, the insulating layers generally have a significantly greater proportion of the cross-section and mass of the mold structure than the heating wires or heating fibers. This leads, for one thing, to a temperature increase at the border layer between heating wire or heating fiber, respectively, as well as to inherent stresses as the result of the different mechanical and thermal properties of heating wires or heating fibers, respectively. In particular, a risk of distortion of the molds is also connected with this.

As already mentioned above, carbon fibers (called C fibers or carbon fibers) can also be used as electrically conductive fibers. In comparison with most metals, C fibers have a low electrical conductivity, and in comparison with plastics, they demonstrate good heat conductivity in the fiber direction. For this reason, they are particularly well suited as ohmic resistance fibers. Another particular feature is the low thermal expansion coefficient of the carbon fibers, which is indicated, depending on the fiber type, at values of approximately $\alpha_{therm.} \approx -0.1 \cdot 10^{-6}/K$. Carbon fiber laminates (so-called CFRP, carbon fiber reinforced plastics, are layered structures composed of carbon fibers that are embedded in a matrix that frequently consists of plastic) can therefore be structured in such a manner, with a corresponding fiber orientation, so that heat expansion of the laminates is practically not measurable in broad temperature ranges.

Up to now, plastic components or plastic molds heated with carbon fibers have been structured in such a manner that either individual fibers, fiber strips, or woven fabrics, or a thin carbon fiber nonwoven fabric having short fibers are embedded in plastic molds, between other, electrically insulating layers. These components or molds have in common that there is a clear separation of functions between the carbon fibers that serve for resistance heating and other laminate layers, which essentially form the supporting structure of the mold and furthermore also generally take over electrical insulation of the current-carrying carbon fibers.

A heatable molding tool is known from DE 10 2004 042 422 A1, in which an electrical resistance heating element is used with carbon fibers embedded in a plastic matrix, but in which great heating power is required because of the arrangement of the resistance heating element relatively far away from the surface of the component to be produced, and because of the layer thicknesses of the fiber composite layers of the molding tool, in order to sufficiently temper the component. Also, because of the serial circuit of the individual carbon fiber elements, electrical operational readiness is not guaranteed, because of possible short-circuits and thus also failures of the heating system at certain points.

Up to now, structuring the heating layer has generally taken place, in the case of individual fibers or fiber strips, in that individual or multiple parallel fibers or fiber strips are laid onto the surface to be heated, as strands. The individual strands are then switched in series, whereby two strands that lie next to one another, in each instance, are interconnected to form a total of four serial strands. Corresponding dimensioning and wiring was described by the company R&G Flüssigkunststoffe [R&G Liquid Plastics] from Waldenbuch in the brochure "Heizsystem für Kunstharzformen" [Heating system for synthetic resin molds]. This brochure shows, using an example, how a total of eight strands, each individual one consisting of four carbon fibers that lie next to one another, are switched in series.

Significant disadvantages particularly occur in this method of procedure if strands are switched in series, because greater potential differences occur between two fiber strands that encounter one another. This always leads to short-circuits in the form that can be brought about by individual carbon filaments of fiber strands that encounter one another. This problem particularly occurs in the case of a meander-shaped arrangement of the heating elements. It is true that this can be avoided by means of a sufficiently great safety distance between carbon fiber strands that encounter one another. But in this connection, at the same time, broader "unheated zones" then occur, and this again results in a non-homogeneous temperature distribution.

Another disadvantage lies in the different mechanical and thermal properties of the other laminate layers, which form the electrical insulation of the heating layer and furthermore essentially form the support structure of the mold. These generally consist of glass fiber reinforced plastics (GFRP). Because of the different heat expansion of GFRP and CFRP (carbon fiber reinforced plastics), significant heat stresses and distortions occur at corresponding temperature differences.

These can generally be managed only by means of great wall thicknesses of the mold structure, but cannot be avoided entirely. Another known approach in this connection is to structure plastic molds with a sandwich construction, and with this approach, distortion can be reduced, but cannot be entirely avoided under the stated conditions.

From FR 2 691 400 A1 and E 0 218 038 A1, molding tools are known in which unidirectionally formed arrangements of carbon fibers are introduced into a plastic matrix, close to the surface, as heating elements, and serve for heating work pieces that are to be produced.

It is therefore the task of the present invention to avoid the problems in heating molding tools as described, and to ensure that heating of molding tools can be carried out in reliable and energy-efficient manner, with a suitable structure of the layers of the molding tool.

The solution for the task according to the invention results from the characterizing features of claim 1 in interaction with the characteristics of the preamble. Other advantageous embodiments of the invention result from the dependent claims.

The invention relates to a molding tool for original shaping or reshaping of components composed of materials that can be thermally influenced, preferably of plastics and, in particular, of fiber composite materials, in which the molding tool has a fiber composite structure and an electrical resistance heating element, whereby carbon fibers or carbon filaments are embedded into the fiber composite structure of the molding tool in a plastic matrix, close to the shaping surface of the molding tool. Such a molding tool, of the type stated, is further developed in that the carbon fibers or carbon filaments in the plastic matrix, close to the shaping surface, essentially determine the mechanical strength, the rigidity and/or the heat expansion of the molding tool, and that the electrical resistance heating element is interconnected in such a manner that at least individual sections of the electrical resistance heating element form an electrical parallel circuit with one another. The uniqueness of the invention lies in the integration of the heating layer and the structure of the mold surface. It is significant, in this regard, that the carbon fiber layer is used as a resistance heating element, and, at the same time, forms the essential component of the cross-section of the mold surface. In this connection, it is not the layer thickness proportion of the carbon fiber layers in comparison with other layers that is decisive, but rather the fact that the carbon fiber layers dominate the mechanical properties, particularly the strength, the rigidity, and also the heat expansion of the layer structure of the fiber composite structure. The mass of corresponding molding tools can be clearly reduced, and this clearly increases the heat capacity of the molding tools as a whole and thus the use of energy when heating the molding tools. Because of the structure according to the invention, and a coordinated material selection, heat distortion of the molds can be avoided, to a great extent, over a broad temperature range. With the invention, a cost-advantageous solution was found for being able to electrically heat molding tools of almost any size homogeneously and with relatively little energy expenditure. The core of the invention is the integration of heating layer and supporting cover layer, in which the electrical conductivity of carbon fibers is utilized in order to directly use the supporting cover layer of the mold as a resistance heating system. In contrast to previous attempts to use the electrical conductivity of carbon fibers for resistance heating, electrical wiring of the molds, in the form of a parallel circuit, takes place in such a manner that short-circuits, as they occur in the usual serial circuit, due to potential differences of heating strands that encounter one another, are excluded. In this way, it is also possible to do without additional insulating layers, with the exception of the mold cover layer, to the greatest possible extent. Because of the parallel circuit of the electrical resistance heating element, the resistance of the electrical resistance heating element is greatly reduced, and thus heating of the molding tool is already possible at low voltages to be applied.

While in the case of the previous carbon-fiber-based heating layers, preferably unidirectional woven carbon fiber fabrics or interlaid carbon fiber scrims were used, here, preferably bidirectional woven carbon fiber fabrics are used. The use of multiaxial woven fabrics or interlaid scrims is also possible. In the present case, carbon fibers that run in the crosswise direction assure potential equalization in the orthogonal direction to the current flow of the heating layer. In this manner, defects or interruptions in individual carbon fibers can also be bridged. In this connection, the carbon fibers that are directly contacted electrically can preferably run parallel in the longitudinal direction of the molding tool, and additional carbon fibers that run crosswise or at a slant to them can help to take on a conductive function, indirectly by way of the layer contact, and in this manner can bring about an electrical potential equalization crosswise to the main current flow direction, on the one hand, and on the other hand, can make a multiaxial, preferably quasi-isotropic laminate structure possible, which allows building up cover layers having very low heat expansion, when using carbon fibers.

In this connection, in another embodiment, it is possible that the arrangement of carbon fibers or carbon filaments that forms the electrical resistance heating element can be configured, in whole or in part, as individual fibers or individual filaments and/or as units in the form of interlaid scrims, woven fabrics, nonwoven fabrics, or as strands that are parallel to one another. In this connection, individual sections of the surface of the molding tool in the component side can be formed, over their full area or also only in sections, with such units, which are then interconnected with one another again, as a whole, in the form of a parallel circuit. It is advantageous, in this connection, that aside from the adaptation of the mold and the formation of such units to the topography of the component, in each instance, extensively area-wide heating of the component is achieved, which can only be achieved with very great effort in the case of usual resistance heating elements switched in series, which run in meander shape.

It is particularly advantageous in this connection that the carbon fibers or carbon filaments are embedded in the plastic matrix directly adjacent to the component-side surface of the molding tool. The heating of the molding tool that is integrated in this way produces the heating power directly at the component-side mold surface. In this connection, the heating system acts on a large area, directly where the heat is needed. This shortens the heat flow paths, reduces excess temperatures in the immediate vicinity of the carbon fibers, and leads to very energy-saving implementation of the electrical heating energy.

In a further embodiment, it is possible that the arrangement of carbon fibers or carbon filaments or units composed of them, that forms the electrical resistance heating element, is configured to be essentially quasi-isotropic. In this way, the result can be achieved that with regard to both the mechanical strength values and the thermal effect of the carbon fibers or carbon filaments or the units formed from them, the same conditions are present in all regions of the molding tool, and thus uniform tempering of the component is achieved over all the regions of the component to be produced.

Another embodiment is structured in such a manner that partially, either additional carbon fiber layers are applied, or also, the number and/or thickness of the carbon fiber layers is/are reduced. The essential characteristic in this connection is that on the basis of the ohmic behavior of the mold, the area-related heating power is partially changed. In this manner, different area-related heating powers can also be balanced out, such as those that necessarily occur in the case of non-rectangular mold cross-sections, for example. For example, in the case of an elongated trapezoid mold having a clear point, the total thickness of the carbon fiber layers would have to continuously increase toward the pointed end, in order to achieve a constant area-related heating power over the entire mold surface.

It is also possible that electrically non-conductive regions are formed between individual units of the arrangement of carbon fibers or carbon filaments that forms the electrical resistance heating element. Such non-conductive regions can serve for targeted temperature development in the component, since no active tempering takes place in such non-conductive regions, either, and thus temperature gradients within the component, as it hardens, can be achieved in targeted manner. In this connection, it is possible that the electrically non-conductive regions are inserted within a plane or perpendicular between two planes that are disposed on top of one another, in order to separate the resistance heating elements that lie adjacent next to one another or on top of one another, in each instance, from one another.

With regard to the mechanical behavior of the molding tool, it is particularly important that the arrangement of carbon fibers or carbon filaments or units formed from them, that forms the electrical resistance heating element, in the plastic matrix, demonstrates great rigidity. In this way, the overall rigidity of the molding tool is very predominantly determined by the carbon fiber layers, since at the same time, the other layers can be structured to be less rigid. Furthermore, in this way, heat tensions between different materials in layers of the molding tool designed to have approximately the same rigidity can be avoided, and thus distortion of the molding tool when heated can be decisively reduced, thereby making it possible to clearly increase the dimensional accuracy of the component to be produced.

It is important with regard to the tensions and deformations that occur during tempering of the molding tool that the heat expansion of the layer of carbon fibers or carbon filaments or units formed from them, in the plastic matrix, which contains the electrical resistance heating element, is very low. In this way, even at greater temperature changes of the molding tool, only a slight dimensional change in the component to be produced accompanies them, and thereby production is simplified and improved. The cycle times when using the molding tool can be further reduced by means of active cooling, which can be achieved in simple manner in that when structuring the molding tool with sandwich construction, the sandwich core has channels passing through it, through which cooling air or other gaseous or liquid cooling media are passed. In this connection, it is fundamentally possible to pass corresponding media through the mold in a closed circuit, to equalize temperature gradients during the heating phase. A corresponding drainable mold can be built up in simple manner, for example with slit core materials.

A further improvement in the efficiency of the use of molding tools formed according to the invention can be achieved, since the energy expenditure for heating the molding tool is also only slight, because of the slight layer thicknesses of the material of the layer that contains the electrical resistance heating element. Tempering and cooling of the mass of the molding tool can take place significantly faster and with less use of energy, because of the slight layer thicknesses, so that the cycle times for the production of corresponding components can be reduced.

Furthermore, it is advantageous that the electrical resistance of the carbon fibers or carbon filaments or units formed from them, which are switched in parallel with one another, is very slight, because of the parallel circuit. This makes it possible to achieve the result that even slight voltages, particularly low-volt voltages, can be used for heating at the electrical resistance heating element, and as a result, the electrical operational readiness is guaranteed, and the use of energy is minimized.

It is advantageous with regard to the configuration of the surface of the component to be produced if the component-side surface of the molding tool is formed by a mold cover layer that also covers the layer that contains the electrical resistance heating element, preferably with a thin layer. Such a thin mold cover layer assures smooth surfaces of the component, and prevents damage to the layer that contains the carbon fibers. By means of corresponding slight layer thicknesses as well as good heat conduction properties of this mold cover layer, problems in temperature conduction between the layer with the resistance heating element and the component, which are otherwise possible, are reliably avoided.

It is advantageous with regard to the mechanical stability of the molding tool if a reinforcement layer is applied to the side of the layer that has the electrical resistance heating element, facing away from the component. Such a reinforcement layer, which can be formed in the form of a stable light-construction layer, for example from a sandwich construction, assures further mechanical strengthening in the structure of the molding tool, without the weight of the molding tool being increased excessively. In the case of a sandwich construction, in this connection, the heating layer can preferably, at the same time, produce one of the two cover layers that are required to build up a sandwich construction. It is also possible, for example, that the reinforcement layer is configured to be electrically insulating.

With regard to the structure of the layers of the molding tool, it can be advantageous if additional intermediate layers are disposed between the fiber composite layer that contains the electrical resistance heating element, the mold cover layer, and/or the reinforcement layer, which are configured to be electrically insulating, for example, or have an adhesion-promoting function for the adjacent layers of the fiber composite structure. Such intermediate layers, which can be formed from a woven glass fiber fabric, preferably a thin one, in the fiber composite structure, optimize the properties of the entire layer structure.

It is furthermore possible that a layer with carbon fibers that are embedded in a plastic matrix can be provided as the further mold cover layer disposed on the side of the reinforcement layer that faces away from the component. In this way, distortion of the layers of the molding tool during tempering is further prevented, since this additional mold cover layer can be structured to be mechanically similar to the fiber composite layer that contains the electrical resistance heating element, and thus a reinforcement layer that might be disposed in between is surrounded on both sides by mechanically equivalent layers. It is possible, in this connection, that the carbon fibers of the mold cover layer that faces away from the component is electrically insulated with regard to the carbon fibers of the fiber composite layer that faces the component and contains the electrical resistance heating element.

With regard to uniform mechanical and electrical properties of the fiber composite layer that contains the electrical resistance heating element, it is advantageous if the orientation of carbon fibers or carbon filaments or of the units of carbon fibers or carbon filaments is offset and/or rotated with regard to other carbon fibers or carbon filaments or the units of the same fiber composite layer. In this way, the fibers or units can be oriented in such a way that mechanical stresses and also the temperature production takes place extensively uniformly within the fiber composite layer that contains the electrical resistance heating element, and accordingly, is also transferred uniformly to the component.

It is furthermore advantageous if the mold cover layer and the intermediate layers have only slight rigidity, and influence the mechanical properties of the entire fiber composite structure only slightly. As a result, there are no significant tensions between the individual layers during tempering of the molding tool, so that distortions of the molding tool are minimized.

With regard to the electrical contacting of the electrical resistance heating element, it is advantageous if the arrangement of carbon fibers or carbon filaments or units formed from them, which forms the electrical resistance heating element, is electrically contacted on the end side of the fibers or the units, and interconnected with one another as a parallel circuit. By means of the external contacting, good accessibility of the resistance heating element can be achieved, and the wiring work for the parallel circuit can be easily carried out.

With regard to tempering of the component, it has particularly proven to be particularly advantageous for the required energy expenditure if, during heating of the molding tool for shaping of a component, the molding tool is sheathed with thermal insulation, at least in sections. By means of the thermally insulating sheathing, the heat produced can be held particularly well within the molding tool, and, depending on the presence of insulation material, the type and thickness of the insulation material, as well as the placement of the insulation material, the insulation material can be used for local temperature control during heating of the component within the molding tool. Thus, it is possible, for example, to insulate the molding tool only locally, and thereby to produce locally higher temperatures, which influence hardening of the component in a different way than in regions that are not insulated or are less insulated. This allows further influencing of the production process of the component within the molding tool.

It is particularly advantageous if the materials of the molding tool are designed for such temperatures that the layers of the fiber composite structure that form the molding tool can withstand a temperature during the production of the component of up to 300° C., preferably of up to 140° C., without any problems, without losing any of their own strength properties. In another embodiment with regard to temperature stability, it is also possible that ceramic matrix materials are used to form the fiber composite structure or parts of it.

It is furthermore possible that the electrical heating elements are segmented in the current flow direction, and individual segments can be bridged by additional electronic components, in whole or in part, in order to influence the current flow and the heating power in the corresponding segment. In this way, thermal energy can be introduced, in very targeted manner, into the components to be processed, in which thermal energy is needed, whereas no or little thermal energy is produced in the electrical heating elements in other regions. It can be advantageous, in this connection, if the electrical heating elements are segmented in the current flow direction, and the individual segments of a heating element form a serial circuit. In this way, the result can particularly be achieved that the segmented electrical heating elements, as a whole, can be operated with low voltage even at great dimensions of the molding tool, and therefore simple heating of the molding tool can be achieved both electrically and in terms of safety technology.

Furthermore, it is possible that individual current-conducting layers, disposed on top of one another, of the electrical heating elements are insulated with regard to one another, in the thickness, direction, by means of thin insulating layers, in such a manner that individual segment division can be achieved by means of stacking thin-layer heating elements in multi-layer technology. Here, a different introduction of thermal energy that can be achieved with the segmented structure of the heating elements is achieved by means of stacking the heating elements essentially perpendicular to the molding tool surface; the heating elements are stacked on top of one another, separated from one another by means of thin insulating layers, in each instance.

In a further embodiment, the current flow in the molding tool can be locally changed by means of additional thin electrical heating elements, introduced in locally limited manner, in such a way that a partial change of the area-related heat power within the surface of the molding tool is possible. By means of all the measures mentioned above, it can be assured that a locally effective change in the introduction of thermal energy into the surface of the molding tool is achieved, which change is advantageous for the original shaping or reshaping of the component at this local location, for example.

A particularly advantageous embodiment of the molding tool according to the invention, according to claim 1, is shown in the drawing.

This shows.

Figure 1:
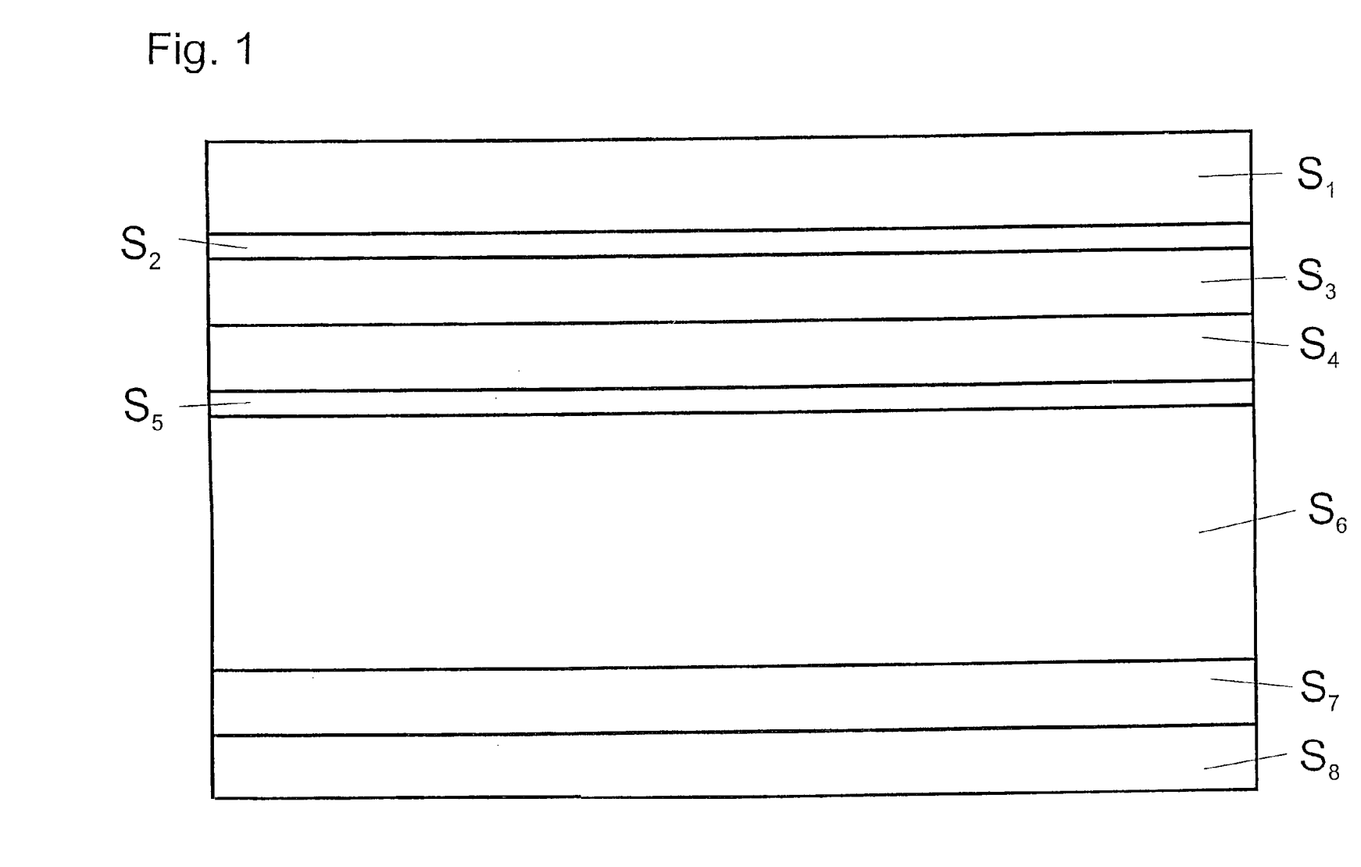
FIG. 1—structure of a simple heatable molding tool according to the invention, in the form of a rectangle, shown using the example of a cross-section, part of which is shown, FIG. 2—current, heating power, and area-related heating power of the mold at a predetermined heating voltage of the molding tool according to FIG. 1, FIG. 3—temperature progressions when heating the molding tool according to FIG. 1, with different insulations, at an area-related heating power of 200 W/m$^2$.

As an example, in FIG. 1, the structure of a simple heatable molding tool in the form of a rectangle is indicated, in which the molding tool can be produced with the following layer structure:

1$^{st}$ layer: mold cover layer (layer thickness $s_1 \approx 0.4$ mm)

2$^{nd}$ layer: woven glass fiber fabric 105 g/m$^2$ (layer thickness $s_2 \approx 0.1$ mm)

3$^{rd}$ layer: biaxial woven carbon fiber fabric 193 g/m$^2$ (layer thickness $s_3 \approx 0.27$ mm), fiber orientation 0°/90°

4$^{th}$ layer: biaxial woven carbon fiber fabric 193 g/m$^2$ (layer thickness $s_4 \approx 0.27$ mm), fiber orientation ±45

5$^{th}$ layer: woven glass fiber fabric 105 g/m$^2$ (layer thickness $s_5 \approx 0.1$ mm)

6$^{th}$ layer: polyamide honeycomb core ECA 3.2-48 (layer thickness $s_6 \approx 12.7$ mm)

7$^{th}$ layer: biaxial woven carbon fiber fabric 193 g/m$^2$ (layer thickness $s_7 \approx 0.27$ mm), fiber orientation ±45

8$^{th}$ layer: biaxial woven carbon fiber fabric 193 g/m$^2$ (layer thickness $s_8 \approx 0.27$ mm), fiber orientation 0°/90°

It is understood that the layer structure listed is only an example of many possible layer structures, and can be modified in many different ways within the scope of the invention.

If one considers the entire cross-section of the molding tool shown in FIG. 1 as a sandwich construction, then the layers 1 to 5 form the first sandwich cover layer. The 6$^{th}$ layer is the sandwich core, and the layers 7 and 8 form the second sandwich cover layer.

The layers reinforced with woven fabric were saturated with a cold-curing lamination resin, which has a heat shape stability of up to 140° C. after corresponding tempering.

The mold cover layer, having a layer thickness $s_1$, consists, for example, of a conventional mold cover layer resin having a heat shape stability of 140° C. In comparison with the fiber-reinforced layers, this layer is relatively thick. Because of the low rigidity in comparison with the layers of the woven carbon fiber fabric, however, it has only a slight influence on the mechanical properties of the mold structure as a whole. The mold cover layer can be polished and, because of the pore-free surface, guarantees a great number of unmolding processes with little mold wear.

The woven glass fiber fabric layer having the layer thicknesses $s_2$ and $s_5$ can be necessary for production technology reasons, and is supposed to assure good adhesion between the mold cover layer $s_1$ and the layers of the woven carbon fiber fabric $s_3$ and $s_4$. These layers, too, have a low rigidity as compared with the subsequent layers of the woven carbon fiber fabric, and have only a slight influence on the mechanical properties of the mold structure as a whole.

The layers of the woven carbon fiber fabric $s_3$ and $s_4$ form both the electrical resistance heating layer and the essential structural component of the first sandwich cover layer. Because of their great rigidity in comparison with the other layers, they determine the mechanical properties and the thermal expansion of the first sandwich cover layer, to a great extent.

The woven glass fiber cover layer $s_5$, like $s_2$, can be necessary for reasons of production technology, and guarantees good adhesion between the layers of the woven carbon fiber fabric and the sandwich core $s_6$.

The layers of the woven carbon fiber fabric $s_7$ and $s_8$ form the second sandwich layer, as a quasi-isotropic laminate structure.

Since the thermal expansion of the two sandwich cover layers is essentially determined by the carbon fibers, their heat expansion and thus the possible heat distortion at different temperatures is very slight.

In connection with the structure of the molding tool as described, essentially the following deliberations and properties come to bear:

An essential component of the mold is a layer of woven carbon fiber fabric in a plastic matrix, which takes on both a supporting function of the mold understructure and serves directly as a heating layer, in the form of an electrical resistance heating system, by means of current applied to the carbon fibers. In this connection, the woven carbon fiber fabric in the plastic matrix should have as quasi-isotropic a structure as possible. By means of integration of mold heating system and supporting mold understructure, the material expenditure for the molding tool can be clearly reduced. At the same time, the amount of heat required to heat up the mold is reduced. Furthermore, in this way heat tensions between different materials can be avoided.

The woven carbon fiber fabric in the plastic matrix, which is as homogeneous as possible, forms a single heating strand that is preferably switched in parallel in the longitudinal direction of the mold. As a result, the heating element consists of a thin laminate layer. In the case of interconnection in the longitudinal direction of the mold, the cross-section approximately corresponds to the product of the width "B" of the mold and the thickness "s" of the woven carbon fiber fabric. In the present case, the length "L" of the heating element approximately corresponds to the total length of the molding tool.

A resin-rich mold cover layer, which guarantees a pore-free surface of the mold and a good parting effect during component production, will generally be required in this connection. This mold cover layer should be as thin as possible, if it is necessary at all, and should have only an insignificant influence on the mechanical and thermal properties of the layer of the woven carbon fiber fabric in the plastic matrix.

The heated layer of the woven carbon fiber fabric in the plastic matrix forms the actual mold surface, if applicable in combination with the mold cover layer mentioned above, which surface has a thin wall, on the whole, and is therefore relatively non-resistant to bending. For reinforcement, the molding tool can be structured with a sandwich construction. In this connection, the core material of the reinforcement layer can be electrically insulating, if a current flow to the second cover layer is supposed to be prevented. If the current flow to the second cover layer is desired, an electrically conductive core material of the reinforcement layer can also be used.

The second mold cover layer also preferably consists of a quasi-isotropic woven carbon fiber fabric in a plastic matrix. In this way, the temperature expansion of the molding tool is essentially determined by two quasi-isotropic cover laminates. Since these laminate structures are known to demonstrate only very slight heat expansion in a broad temperature range, both heat expansion and heat distortion of the mold are very slight, despite different temperatures in the cover layers. If both cover layers demonstrate only slight heat expansion, the bending deformation of the mold as the result of temperature influences also remains very slight. Slight temperature-related bending deformations can furthermore be reduced by increasing the core thickness, without any noteworthy weight increase in the mold.

Other layers can be interposed at any desired point, for example if an electrical insulation of individual layers is desired, or if sufficient adhesion of individual layers to one another makes this appear practical for reasons of processing technology. In this connection, attention must be paid to ensure that additional layers are structured in such a manner that they do not or only slightly influence the mechanical properties, in particular the heat expansion of the heating layer. In this connection, the use of aluminum honeycomb cores of carbon fiber honeycomb cores, in particular, would be possible.

With regard to the design of the heating power of the molding tool according to FIG. 1, the following is significant:

The present heatable mold is rectangular, as an example, having a heated length L=1,370 mm and a width of B=557 mm. Only the location $s_3$ was directly contacted electrically in the present case. For this purpose, four warp threads made of carbon fibers are squeezed into a lead end sleeve and soldered to an embedded ground strip. These warp threads run in the longitudinal direction of the mold and thus form a parallel circuit of the individual resistance threads. Weft threads of this layer of woven fabric, also made of carbon fibers, running crosswise to them, are fundamentally not current-carrying in this arrangement, but can serve to equalize potential if individual warp threads are damaged, for example.

For the electrical resistance of the layer $s_3$, it therefore holds true, in the present case:

$$R_3 = \frac{R_{spec,thread} \cdot L}{n}$$

In this connection:
$R_3$: electrical resistance of the $3^{rd}$ layer
$R_{spec, thread}$: specific resistance of the individual warp thread
L: length of the heating zone
n: number of warp threads switched in parallel Experiments have shown that additional carbon fiber layers that are applied directly to the electrically contacted fiber layer possess almost the same conductivity as the directly contacted layer. In the case of fibers that run at a slant, the correspondingly changed number of fibers per width as well as the resulting length must be taken into consideration. In the present case, the diagonally laid $4^{th}$ layer has the same conductivity, in total, as the $3^{rd}$ woven fabric layer.

Because of additional contact resistances, a slightly higher value is measured at the mold than results from the theoretical calculation. Here, the measured resistance was approximately 12% higher than the previously calculated value.

Figure 2:
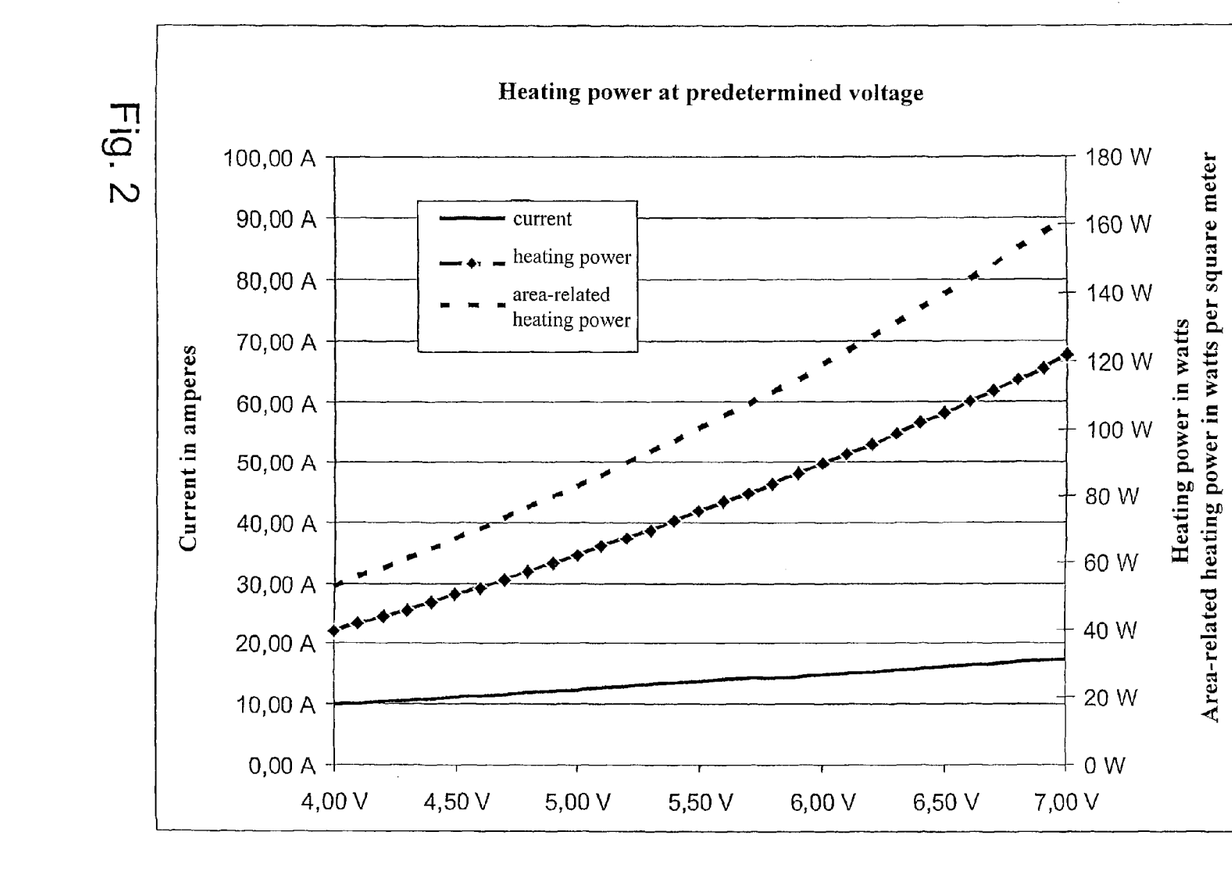

FIG. 2 represents the current, the heating power, and the area-related heating power of the mold, as they result at a predetermined heating voltage. Since the ohmic resistance of the mold heating system changes only insignificantly in the temperature range up to 100° C., the current rises in linear manner with the heating voltage, while the heating power increases with the square of the voltage.

In this connection, it is furthermore significant that the ohmic resistance with a corresponding structure is very slight, so that even larger heating molds can be heated with low voltage.

In different experimental setups, it was possible to show that the theoretically calculated ohmic resistance for different structures of the heating layer agrees well with the measured values.

The temperature that is reached at the mold surface with a corresponding mold heating system essentially depends on the following parameters:
area-related heating power in W/m²,
ambient temperature,
heat flow in the mold,
media that border on the mold, which influence the heat transfer to the surroundings.

In this connection, it was clearly shown that the temperature that can be reached is determined far less by the area-related heating power than by the insulation.

It has proven to be particularly advantageous for the operation of the molding tool if thermal insulation of the molding tool is undertaken.

Figure 3:
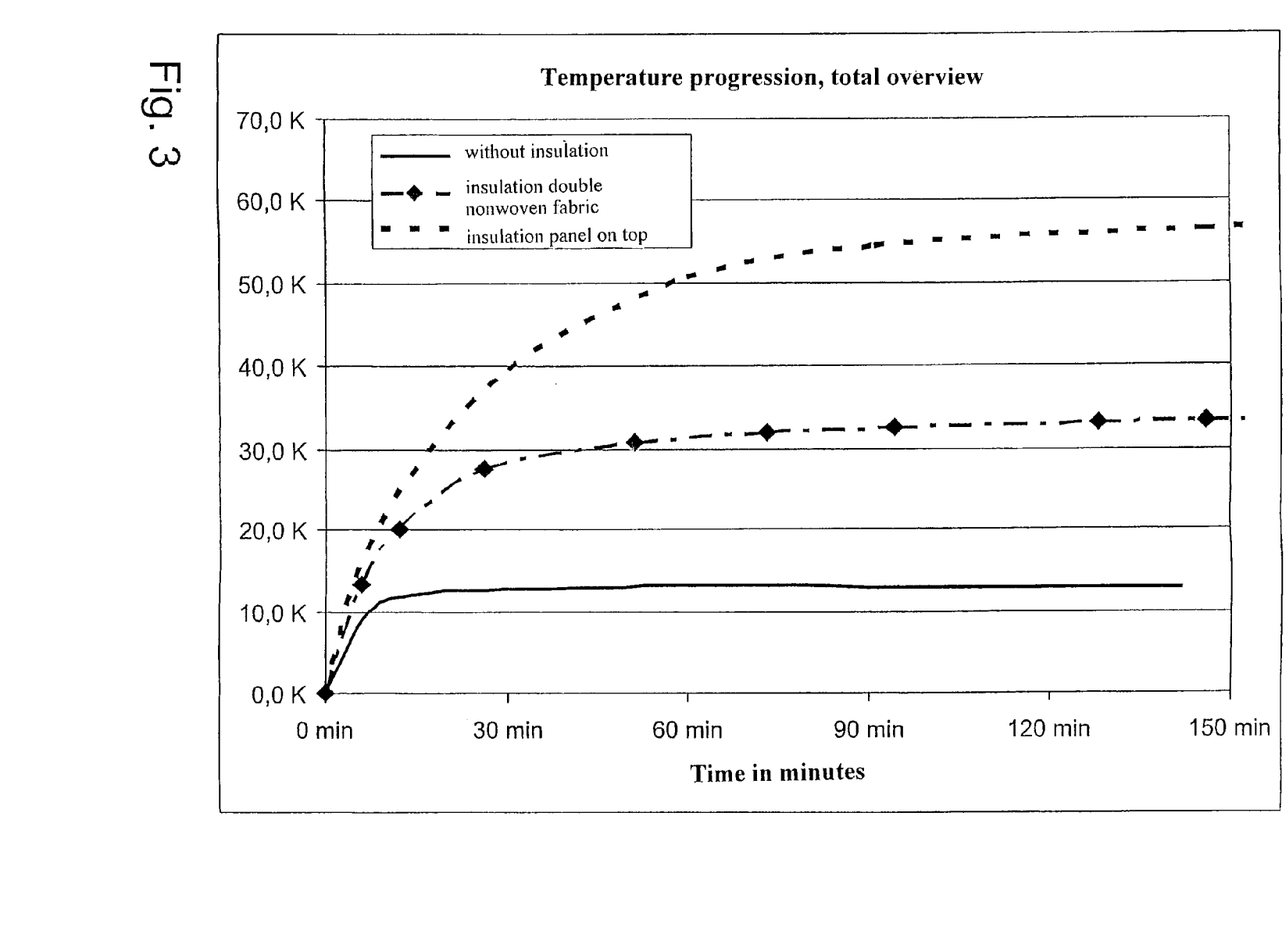

In the case of the simple heating plate described above, at room temperature (approximately 25° C.) a surface temperature of 82° C. should be reached. FIG. 3 shows the temperature progressions of the heating plate with different insulations at an area-related heating power of 200 W/m². The temperature difference with regard to the ambient temperature is shown.

In FIG. 3, the influence of the insulation becomes very clear. While only a temperature increase of 12.9 K was measured at the mold surface, a temperature increase of 33.6 K is measured at the same area-related heating power when a double nonwoven fabric is laid on. With an additional insulation plate lying on the surface, the temperature increase at the same area-related heating power was 57.3 K.

This temperature increase is even clearer if the mold is completely insulated. In another experiment, the heating power was cut in half, to 100 W/m², and the heating mold was insulated with an insulation plate having a thickness of 40 mm, at the bottom and at the top. In this connection, temperatures that lay 70 K above the ambient temperature were measured at the mold surface.

These measurements show that the heating power demand can be significantly reduced by means of simple insulation. In all cases, the heating rates were clearly above the required heating rates, which should, in general, not exceed 10 K/hour in the case of components made from fiber-reinforced epoxy resins.

These studies show that particular attention should be paid to the insulation. In particular, it appears to be possible to be able to influence the temperature progression by means of adding or leaving out insulation material, at a predetermined heating power, in targeted manner, possibly even partially. This could become interesting in the case of complicated shape geometries, for example, in which constant area-related heating over the entire shape geometry might only be implemented with difficulty.

With regard to the usage possibilities of the molding tool according to the invention, the following can be stated:

The usage possibilities of the heatable plastic molds described above preferably lie in areas in which large-area shell components having a simple geometry are produced in small to medium numbers of pieces, and are supposed to be heated in the mold after shaping. In this connection, molds can guarantee temperatures up to approximately 100° C. with the fiber/plastic systems investigated until now. The temperature resistance is limited, in this connection, by the synthetic resin systems used. With other temperature-resistant resin systems, heat mold resistance values up to clearly above 200° C. are possible, without noteworthy process changes having to occur in the production of the molds. However, using ceramic matrix materials, it would also be possible to build and heat molds having a significantly greater heat mold resistance, in similar manner, if necessary.

Potential components that could be produced in corresponding molds, in significantly more economically efficient manner than before, are, in particular, large-area fiber composite components such as support wings, hull, or guide mechanism elements in aircraft construction, panels for various transport systems or medical technology, ship hulls or wind turbines. However, plastic components without fiber reinforcement can also fundamentally be produced in corresponding heatable plastic molds.

For example, large deep-drawing molds can also be structured in the manner described, as can rotation sintering molds, for example.

Other areas of application are possible. Thus, the use of this method of construction does not have to be limited solely to molds. For example, heatable components, for example for aircraft de-icing, or containers that can be electrically heated and are operated with low voltage, bathtubs, or the like, can be implemented in similar manner.

The invention claimed is:

1. A molding tool for original shaping or reshaping of a component composed of thermally influenceable materials,
   the molding tool having a sandwich construction with a first cover layer close to a shaping surface side of the molding tool, a second cover layer and a core in between the first and second cover layers,
   wherein the first cover layer comprises carbon fibers or carbon filaments embedded into a fiber composite structure close to the shaping surface of the molding tool, in a plastic matrix,
   wherein the carbon fibers or carbon filaments are arranged in individual sections of multiaxial woven carbon fiber fabric and/or scrim,
   wherein the carbon fibers or carbon filaments in the plastic matrix essentially determine mechanical properties of the molding tool, the mechanical properties being strength, rigidity and/or heat expansion of the molding tool,
   wherein said individual sections of the multiaxial fabric and/or scrim are contacted as parallel circuits to form an electrical resistance heating element.

2. The molding tool according to claim 1, wherein the carbon fibers or carbon filaments are arranged in an essentially quasi-isotropic configuration.

3. The molding tool according to claim 1, further comprising electrically non-conductive regions between individual units of the carbon fibers or carbon filaments, the electrically non-conductive regions comprising a non-conductive material.

4. The molding tool according to claim 3, wherein a first individual unit of the individual units is disposed on top of a second individual unit of the individual units, and
   wherein a first electrically non-conductive region of the electrically non-conductive regions is disposed in an electrically non-conductive layer between the first individual unit and the second individual unit.

5. The molding tool according to claim 1, wherein the carbon fibers or carbon filaments are arranged to produce heating power to be given off directly at a surface of the component composed of thermally influenceable materials.

6. The molding tool according to claim 1, further comprising a reinforcement layer on a side of the first cover layer facing away from the shaping surface side of the molding tool.

7. The molding tool according to claim 6, wherein the reinforcement layer has a structure in the form of a stable light-construction layer.

8. The molding tool according to claim 6, wherein the reinforcement layer is configured to be electrically insulating.

9. The molding tool according to claim 6, further comprising:
   an intermediate layer disposed between the first cover layer and the core.

10. The molding tool according to claim 9, wherein the intermediate layer is configured to be electrically insulating.

11. The molding tool according to claim 9, wherein the intermediate layer has an adhesion-promoting function for adjacent layers of the fiber composite structure.

12. The molding tool according to claim 9, wherein the intermediate layer includes glass fiber textile.

13. The molding tool according to claim 6, wherein the second cover layer includes carbon fibers embedded in a second plastic matrix.

14. The molding tool according to claim 13, wherein the carbon fibers of the second cover layer are electrically insulated from carbon fibers or carbon filaments of the first cover layer.

15. The molding tool according to claim 1, wherein an orientation of some carbon fibers or carbon filaments of the first cover layer is offset with regard to other carbon fibers or carbon filaments of the first cover layer.

16. The molding tool according to claim 1, further comprising a sheath on the molding tool for thermal insulation.

17. The molding tool according to claim 16, further comprising insulation material for local temperature control when heating the component within the molding tool.

18. The molding tool according to claim 1, wherein the molding tool is designed for a temperature, during production of the component, of up to 300° C.

19. The molding tool according to claim 1, wherein the electrical resistance heating element is segmented in a current flow direction.

20. The molding tool according to claim 1, further comprising channels passing through the molding tool,
   wherein cooling air or other gaseous or liquid cooling media can be passed through the channels.

21. The molding tool according to claim 1, wherein the core has a honeycomb structure.

22. The molding tool according to claim 1, wherein the second cover layer comprises at least one biaxial woven carbon fiber fabric.

23. The molding tool according to claim 1, wherein the first cover layer comprises a first biaxial woven carbon fiber fabric with a 0°/90° fiber orientation and a second biaxial woven carbon fiber fabric with a +/−45° fiber orientation.

\* \* \* \* \*